(12) United States Patent
Amiri et al.

(10) Patent No.: US 11,683,260 B2
(45) Date of Patent: Jun. 20, 2023

(54) ESTIMATING A TRAFFIC MATRIX OF A COMMUNICATION NETWORK USING NETWORK TOPOLOGY FEATURES

(71) Applicant: Ciena Corporation, Hanover, MD (US)

(72) Inventors: Maryam Amiri, Ottawa (CA); John Wade Cherrington, Salt Spring Island (CA); Petar Djukic, Ottawa (CA)

(73) Assignee: Ciena Corporation, Hanover, MD (US)

(*) Notice: Subject to any disclaimer, the term of this patent is extended or adjusted under 35 U.S.C. 154(b) by 128 days.

(21) Appl. No.: 17/373,934

(22) Filed: Jul. 13, 2021

(65) Prior Publication Data

US 2023/0026370 A1   Jan. 26, 2023

(51) Int. Cl.
| | | |
|---|---|---|
| H04L 45/125 | (2022.01) | |
| H04L 45/00 | (2022.01) | |
| H04L 45/12 | (2022.01) | |
| H04L 45/02 | (2022.01) | |

(52) U.S. Cl.
CPC ............ H04L 45/125 (2013.01); H04L 45/02 (2013.01); H04L 45/123 (2013.01); H04L 45/38 (2013.01)

(58) Field of Classification Search
CPC ..... H04L 45/125; H04L 45/02; H04L 45/123; H04L 45/38
See application file for complete search history.

(56) References Cited

U.S. PATENT DOCUMENTS

| | | | |
|---|---|---|---|
| 7,293,086 B1 * | 11/2007 | Duffield | H04L 43/00 709/224 |
| 8,477,679 B2 | 7/2013 | Sharifian et al. | |
| 8,887,217 B2 | 11/2014 | Salem et al. | |
| 9,060,292 B2 | 6/2015 | Callard et al. | |
| 9,432,257 B2 | 8/2016 | Li et al. | |
| 9,686,816 B2 | 6/2017 | Sun et al. | |
| 9,819,565 B2 | 11/2017 | Djukic et al. | |
| 9,832,681 B2 | 11/2017 | Callard et al. | |
| 9,871,582 B2 | 1/2018 | Djukic et al. | |
| 9,980,284 B2 | 5/2018 | Djukic et al. | |
| 10,015,057 B2 | 7/2018 | Djukic et al. | |
| 10,069,570 B2 | 9/2018 | Djukic et al. | |
| 10,148,578 B2 | 12/2018 | Morris et al. | |
| 10,153,869 B2 | 12/2018 | Djukic et al. | |
| 10,390,348 B2 | 8/2019 | Zhang et al. | |
| 10,448,425 B2 | 10/2019 | Au et al. | |
| 10,491,501 B2 | 11/2019 | Armolavicius et al. | |
| 10,623,277 B2 | 4/2020 | Djukic et al. | |

(Continued)

OTHER PUBLICATIONS

Teixeira et al., "Advanced Fiber-Optic Acoustic Sensors," Photonic Sensors / vol. 4, No. 3, 2014, pp. 198-208.

(Continued)

*Primary Examiner* — Pao Sinkantarakorn
*Assistant Examiner* — Kabir U Jahangir
(74) *Attorney, Agent, or Firm* — Clements Bernard Walker; Christopher L. Bernard

(57) ABSTRACT

Systems and methods include receiving network topology information of a network including a plurality of routers; receiving link measurements defining bandwidth on links in the network; determining routes in the network based on the network topology information; and utilizing the routes and the link measurements to determine an estimate of an initial traffic matrix that includes the bandwidth between origin routers and destination routers.

18 Claims, 4 Drawing Sheets

(56) References Cited

U.S. PATENT DOCUMENTS

| | | | |
|---|---|---|---|
| 10,631,179 B2 | 4/2020 | Djukic et al. | |
| 10,644,941 B2 | 5/2020 | Djukic et al. | |
| 10,746,602 B2 | 8/2020 | Pei et al. | |
| 10,887,899 B2 | 1/2021 | Au | |
| 10,945,243 B2 | 3/2021 | Kar et al. | |
| 2013/0159548 A1* | 6/2013 | Vasseur | H04L 45/02 709/239 |
| 2014/0169187 A1* | 6/2014 | Jenkins | H04L 41/145 370/252 |
| 2014/0229210 A1 | 8/2014 | Sharifian et al. | |
| 2016/0226774 A1* | 8/2016 | Farmanbar | H04L 41/14 |
| 2018/0062943 A1 | 3/2018 | Djukic et al. | |
| 2018/0324082 A1* | 11/2018 | Hao | H04L 45/14 |
| 2019/0179668 A1* | 6/2019 | Wang | G06F 9/4881 |
| 2019/0230046 A1 | 7/2019 | Djukic et al. | |
| 2019/0379589 A1 | 12/2019 | Ryan et al. | |
| 2020/0067935 A1 | 2/2020 | Carnes, III et al. | |
| 2020/0313380 A1 | 10/2020 | Pei et al. | |
| 2020/0351380 A1 | 11/2020 | Fedorov et al. | |
| 2020/0387797 A1 | 12/2020 | Ryan et al. | |
| 2021/0028973 A1 | 1/2021 | Cote et al. | |
| 2021/0076111 A1 | 3/2021 | Shew et al. | |
| 2021/0150305 A1 | 5/2021 | Amiri et al. | |

OTHER PUBLICATIONS

Phaal et al., "InMon Corporation's sFlow: A Method for Monitoring Traffic in Switched and Routed Networks," Network Working Group, Category: Informational, The Internet Society, Sep. 2001, pp. 1-31.

Quittek et al., "Requirements for IP Flow Information Export (IPFIX)," Network Working Group, Category: Informational, The Internet Society, Oct. 2004, pp. 1-33.

B. Claise, "Cisco Systems NetFlow Services Export Version 9," Network Working Group, Category: Informational, The Internet Society, Oct. 2004, pp. 1-33.

Claise et al., "Specification of the IP Flow Information Export (IPFIX) Protocol for the Exchange of Flow Information," Internet Engineering Task Force (IETF), Obsoletes: 5101, Category: Standards Track, ISSN: 2070-1721, Sep. 2013, pp. 1-76.

Zhang et al., "Fast Accurate Computation of Large-Scale IP Traffic Matrices from Link Loads," ACM 1581136641/03/0006, 2003, pp. 1-12.

Medina et al., "Traffic Matrix Estimation: Existing Techniques and New Directions," ResearhGate, ACM 158113570X/02/0008, 2002, pp. 1-15.

\* cited by examiner

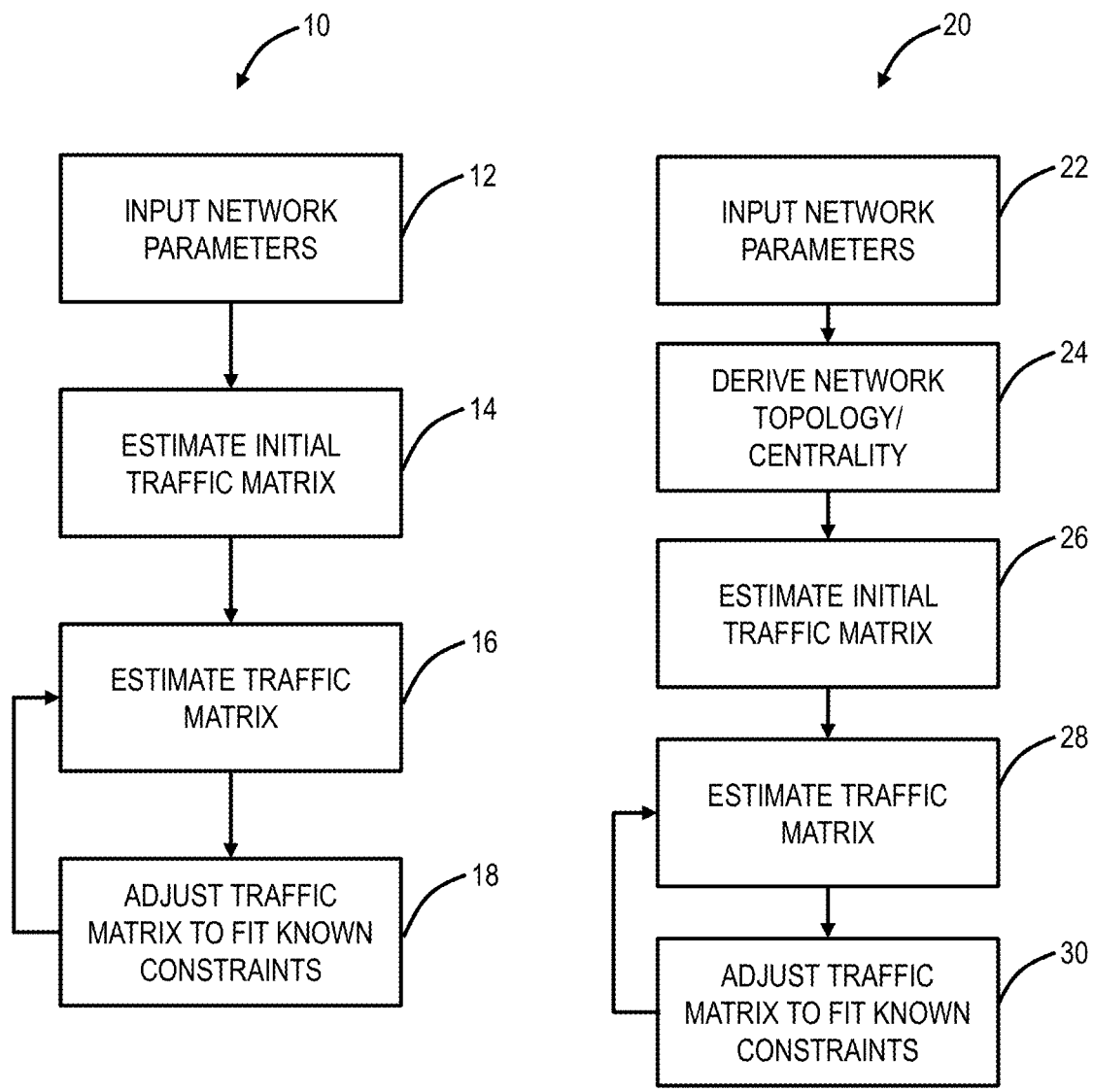

ESTIMATING A TRAFFIC MATRIX OF A COMMUNICATION NETWORK USING NETWORK TOPOLOGY FEATURES

FIELD OF THE DISCLOSURE

The present disclosure generally relates to networking. More particularly, the present disclosure relates to systems and methods for estimating a traffic matrix of a communication network using network topology features.

BACKGROUND OF THE DISCLOSURE

An Origin-Destination (OD) (or Source-Destination) traffic matrix describes the amount of traffic between each OD pair in the network and is a major input to the design, planning, and management of a telecommunications network. The traffic matrix is difficult to measure directly on large commercial backbones. Tunnel packet counters and NetFlow/IPFIX, which sample packets transiting through a given router and infer their origin and destination from packet headers, are the currently used approaches for measurement, but have several drawbacks: (1) they require deploying the same software on all core routers which may not be feasible due to cost and heterogeneity of networking equipment, (2) they generate a significant processor demand on the routers which negatively impacts the router overall performance, and (3) synchronizing individual measures and storing measurement data is complex.

It is possible to estimate the traffic matrix instead of using the measurement approach, i.e., NetFlow/IPFIX. NetFlow is described in RFC 3954, "Cisco Systems NetFlow Services Export Version 9," October 2004, and RFC 3176, "InMon Corporation's sFlow: A Method for Monitoring Traffic in Switched and Routed Networks," September 2001, the contents of both are incorporated by reference. IPFIX is described in RFC 7011, "Specification of the IP Flow Information Export (IPFIX) Protocol for the Exchange of Flow Information," September 2013, the contents of which are incorporated by reference.

All existing approaches of estimation are topology agnostic. Traffic matrix estimation techniques that are being developed in Internet Protocol (IP)-based networks are classified into three main categories:

1) Network "tomogravity" follows a two-step process (see Zhang et al., Fast Accurate Computation of Large-Scale IP Traffic Matrices from Link Loads, SIGMETRICS'03, Jun. 10-14, 2003, San Diego, Calif., the contents of which are incorporated by reference). The first step involves generating an initial traffic matrix (TM) using the standard gravity model that makes use of the intra link measurement data. The second step involves optimizing the prior TM obtained from the gravity model, using the least square method that searches for the best fitting set of values for the demands among many feasible solutions based on prior values and constraints.

2) Entropy maximization involves the process of modelling OD demands utilizing different traffic models such as Poisson, and Gaussian. This statistical approach produces a TM whose elements are parameters of traffic models so that the approach is ready to be utilized for the network dimensioning and planning application that requires a TM that incorporates not only the mean but also the statistical characteristics of the OD demands.

3) A Linear programming method formulates a Linear Programming (LP) approach that maximizes the sum of all weighted OD demands subject to linear constraints that represent the sum of OD demands on a link that must be less than or equal to the capacity of the link. The author suggests that it would be worthwhile to make use of the path length of OD demand as a weight in the objective function to obtain the best result. See, e.g., O. Goldschmidt, "ISP Backbone Traffic Inference Methods to Support Traffic Engineering," in In Internet Statistics and Metrics Analysis (ISMA) Workshop, San Diego, Calif., USA, December 2000, pp. 1063-1075, and S. Eum, J. Murphy, and R. Harris, "A Fast Accurate LP Approach for Traffic Matrix Estimation," in International Teletraffic Congress, (ITC19), Beijing, China, September 2005, the contents of each are incorporated by reference.

In A. Medina, N. Taft, K. Salamatian, S. Bhattacharyya, and C. Diot, "Traffic matrix estimation: Existing techniques and new solutions", in SIGCOMM'02, Pittsburgh, USA, August 2002, the contents of which are incorporated by reference, the authors compared these approaches on a real network.

As the Entropy maximization approach is based on statistical modelling assumptions. It has been noted that such assumptions hold only for some elements of the traffic matrix not for other elements; similarly, they hold in some one-hour periods but not in others, therefore this assumption is not true in any general sense. Also, the approach requires a good initial traffic matrix because the accuracy of the approach is highly dependent upon prior information, therefore the statistical approach converges to poor results if the initial distribution is not satisfied.

The tomogravity is based on a gravity assumption, which is the fan-out distribution of the traffic matrix that can be captured by a gravity model. In other words, the total traffic generated from a node is fanned out to destinations according to the basic gravity model. However, the gravity model is reasonably accurate for some networks, but not others. For example, in a regional network it is accurate, while it significantly underestimates large demands in a backbone network. This seems to imply that the gravity model is not suitable for some networks.

The LP method assigned zero values to many elements of the TM, so it overcompensated by assigning very large values to the other elements of the TM although they utilized the path length of an OD demand as the weight of the objective function, and which results in very poor accuracy, and is quite expensive computationally.

Here is the comparison between the three main traffic matrix estimation approaches:

|  | Advantages | Disadvantages |
| --- | --- | --- |
| Tomogravity method | Fast estimation No traffic model | Topology agnostic Gravity assumption is not always valid |
| Entropy maximization | Capturing variation of traffic | Slow estimation Traffic model assumption |
| Linear programming |  No traffic model | Heavy computation Slow estimation |

BRIEF SUMMARY OF THE DISCLOSURE

The present disclosure relates to systems and methods for estimating a traffic matrix of a communication network using network topology features. The approach described herein significantly improves the performance of traffic matrix estimator. The proposed approach incorporates network graph statistics into the traffic matrix estimation, i.e., network topology. Advantageously, this approach was shown to significantly fast and accurate, delivering the traffic matrix in under a few seconds. Another major advantage of this approach traffic matrix inference scales to handle networks larger than any previously attempted using alternative methods. Since the initial estimation is computed with realistic assumption (fair usage of link bandwidth), it is expected that initial point is very close to the real flow counts. By doing so, the search space for finding the optimal solution is reduced significantly. This allows all recursive methods converge to the optimal solution very fast. Furthermore, this router-to-router traffic matrix may be used to directly derive an even more accurate Point of Presence (PoP) to PoP traffic matrix, and easily extending to incorporate more detailed measurements where available.

In various embodiments, the present disclosure includes a method with steps, an apparatus including a processor configured to implement the steps, and a non-transitory computer-readable medium with instructions that, when executed, cause a processing device to perform the steps. The steps include receiving network topology information of a network including a plurality of routers; receiving link measurements defining bandwidth on links in the network; determining routes in the network based on the network topology information; and utilizing the routes and the link measurements to determine an estimate of an initial traffic matrix that includes the bandwidth between origin routers and destination routers.

The determining routes can include determining edge betweenness centrality between the plurality of routers that are edges in a network graph. The determining routes can assume traffic flows on a shortest path between the plurality of routers. The steps can further include determining the routes from listening to routing protocol messages. The steps can further include receiving partial direct measurements for the bandwidth and subtracting the partial direct measurements from the link measurements before determining the estimate. The steps can further include iteratively adjusting the initial traffic matrix to refine the estimate using other network information. The other network information can include any of link capacity, network topology, queuing discipline, and link aggregation. The iteratively adjusting can utilize an iterative statistical estimation procedure. The initial traffic matrix is at a point in time, and the steps can further include repeating the receiving steps, the determining step, and the utilizing step at different points in time; and averaging results to determine a traffic matrix over the point in time and the different points in time.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a flowchart of a general process for an iterative estimation of a traffic matrix, based on the conventional approach.

FIG. 2 is a flowchart of a process that uses topology for an iterative estimation of a traffic matrix.

DETAILED DESCRIPTION OF THE DISCLOSURE

Figure 3:
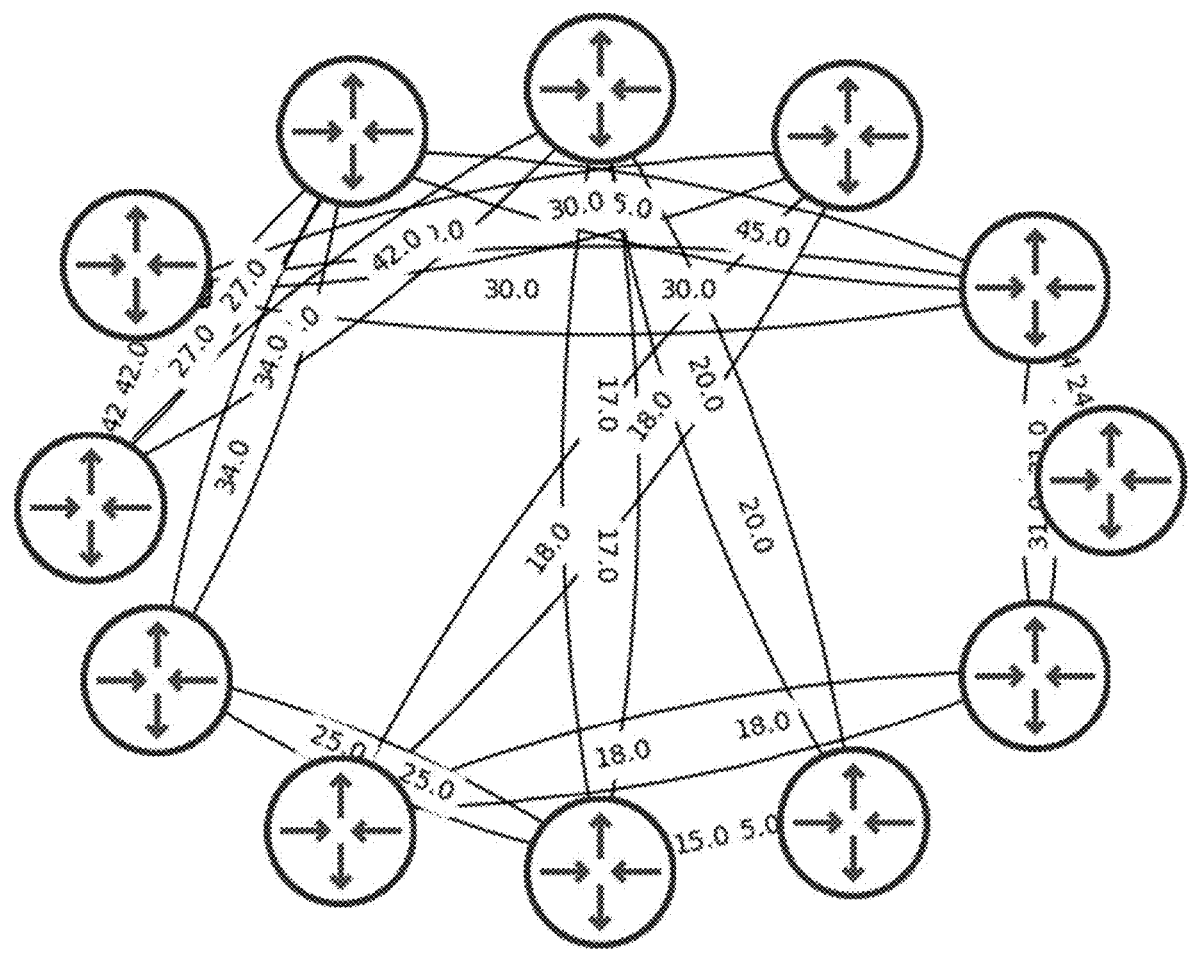
FIG. 3 is a network diagram of calculated EBC for edges of an example network topology.

The present disclosure relates to systems and methods for estimating a traffic matrix of a communication network using network topology features. The approach described herein significantly improves the performance of traffic matrix estimator. The proposed approach incorporates network graph statistics into the traffic matrix estimation, i.e., network topology. Advantageously, this approach was shown to significantly fast and accurate, delivering the traffic matrix in under a few seconds. Another major advantage of this approach traffic matrix inference scales to handle networks larger than any previously attempted using alternative methods. Since the initial estimation is computed with realistic assumption (fair usage of link bandwidth), it is expected that initial point is very close to the real flow counts. By doing so, the search space for finding the optimal solution is reduced significantly. This allows all recursive methods converge to the optimal solution very fast. Furthermore, this router-to-router traffic matrix may be used to directly derive an even more accurate Point of Presence (PoP) to PoP traffic matrix, and easily extending to incorporate more detailed measurements where available.

If direct measurements are not available, link count measurements (aggregate of multiple flows) and routing table information are usually available. If direct measurements are available, due to the heterogenous nature of IP networks it is likely that not all OD flows are measured. As is shown herein, finding the entire traffic matrix in either case can be done by combining partial direct measurements and utilizing the available link counts and routing information.

As described herein, the traffic matrix includes bandwidth between origin and destination. Bandwidth is an amount of traffic on a given link over a given time and can be expressed as megabits/second, gigabits/second, etc. For a given link, routers are able to keep logs of link count measurements, e.g., the amount of data seen on that link over some period of time. The present disclosure contemplates various definitions for bandwidth and any such definition can be used to describe the entries in the traffic matrix. For example, RFC 3917, "Requirements for IP Flow Information Export (IP-FIX)," October 2004, the contents of which are incorporated by reference, describes building a statistical model of a flow that includes its duration, volume, time, and burstiness. As such, related to bandwidth, this could describe estimating the volume of an IP flow in the period of time in-between the measurements. For example, assume there is a desire to for an estimate of the volume of a single/aggregated traffic flow between a pair of A-Z in a network, over a 15-minute interval (how many bytes of flow(s) observed in 15 minutes). Given this estimate, it is possible to estimate the aggregate IP flow rate in the 15-minute interval taking the volume and dividing it by time.

Traffic Matrix Estimation from Link Measurements and Routing Information

In an IP network, the routes can be obtained by noting that most intradomain routing protocols (e.g., Open Shortest Path First (OSPF) and Intermediate System-Intermediate System (IS-IS)) are based on a shortest path algorithm such as Dijkstra's or Bellman-Ford algorithms. Routing information can be obtained by listening to routing protocol messages (various planning tools and Network Management Systems (NMS) can do this). Link volumes in an IP network are typically available from Simple Network Management Protocol (SNMP) data or by directly querying routers. The OD traffic demands are the unknown that need to be estimate from the demands. That is, the available information includes topology (connectivity between routers), routes (computed using specific protocols), and traffic volume on each link. What is unknown is the OD traffic volume/matric. The traffic volume on each link is a raw number and does not show the OD.

The instantaneous traffic matrix can be related to link measurements and the routing matrix with $$y \approx Rx \quad (1)$$

where y is the vector of measured link loads over links in the network, R is the routing matrix, and x is OD traffic matrix with one row corresponding to the demand of each OD pair. A flow in the matrix is denoted with $x_i \in x$. The routing matrix is structured in a way that the link measurements y correspond to the sum of OD flows that traverse the link. Due to packet latencies and the random nature of OD pair traffic, the equation is approximate.

If partial direct measurements are available, they are subtracted from the link measurements and their OD traffic matrix entry is no longer an unknown in (1). If multipath routing is used, the flow is assumed equally split along the multiple paths and it exists as multiple entries in (1).

It should be obvious that the instantaneous traffic matrix can be estimated with $$x \approx R^{-1} y \quad (2)$$

where $R^{-1}$ is the "inverse" of the routing matrix. Alas, the routing matrix undetermined and is typically not invertible, so this solution is not possible.

To get around the undetermined matrix problem, iterative methods are used to estimate the traffic matrix.

Iterative Traffic Matrix Estimation

This disclosure describes a new approach for traffic matrix estimation from link count measurements and routing information. The approach uses the network topology to arrive at a better traffic matrix estimate than what was possible previously. The topology of a network captures the information network planners had about expected network traffic, so this is extra information used to find a better estimate of the traffic matrix.

FIG. 1 is a flowchart of a general process 10 for an iterative estimation of a traffic matrix, based on the conventional approach. The process 10 is iterative, receiving input network parameters (step 12), taking an initial traffic matrix estimate (step 14), and then using an estimation procedure (step 16) followed by an adjustment procedure (step 18). As the process 10 goes on, it produces a sequence of the traffic matrix estimates $x_0, \ldots, x_n$, each of which is expected to be closer to the true traffic matrix x in (1). The initial traffic matrix estimates and the estimate in the iterative step may produce a traffic matrix which may not match information known about the traffic (e.g., ingress/egress aggregate counts), which is fixed by using an adjustment procedure that projects the estimate into the known constraints. The success of iterative procedures is highly dependent on the initial traffic matrix estimate.

FIG. 2 is a flowchart of a process 20 that uses topology for an iterative estimation of a traffic matrix. FIG. 2 illustrates how the present disclosure differs from known approaches. Steps 22, 26, 28, 30 of the process 20 are similar to steps 12, 14, 16, 18 of the process 10, respectively. The process 20 includes a step of deriving the network topology/centrality (step 24) before the initial traffic matrix estimation (step 26).

The process 20 uses a novel and effective initialization procedure for the estimation process that produces the initial traffic matrix $x_0$. The initial traffic matrix estimation uses the knowledge of the network topology (inferred from the routing matrix) to roughly partition link counters according to what the topology implies about end-to-end traffic. The rest of the procedure can remain, so a plethora of existing methods can benefit from this approach.

The accuracy of process 20 was compared with that of other approaches the performance reduces the estimation error by 20%-30%.

Initial Traffic Matrix Estimate

A significant aspect in this is disclosure is in how the initial traffic matrix is determined. The initial matrix is determined with the use of edge betweenness centrality (EBC). Assume that from the knowledge of the routing matrix, there is a set of vertices V and the set of edges E for a topology graph. It is also possible to derive the set of shortest paths. Edge betweenness centrality (EBC) for an edge $e \in E$ is defined as:

$$EBC(e) = \sum_{v_i \in V} \sum_{v_j \in V} \frac{\gamma_{v_i,v_j}(e)}{\gamma_{v_i,v_j}} \quad (3)$$

where $v_i \in V$ is a node, $\gamma_{v_i,v_j}$ is the number of shortest paths between nodes $v_i$ and $v_j$, and $\gamma_{v_i,v_j}(e)$ is the number of paths between $v_i$ and $v_j$ that pass through e.

It should be noted that value of $\gamma_{v_i,v_j}(e)$ can be integral in case that just on shortest path is used among sources and destinations, while in the general case where there are multiple shortest paths with equal cost multiple paths (ECMP) are used, it can be fractal. This value can be obtained directly from routing matrix by adding up all elements of rows corresponding to edges. As it will be explained in (6) where it is shown how routing matrix is constructed for ECMP scenarios, it would be obvious how ECMP is considered in computing $\gamma_{v_i,v_j}(e)$.

Figure 4:
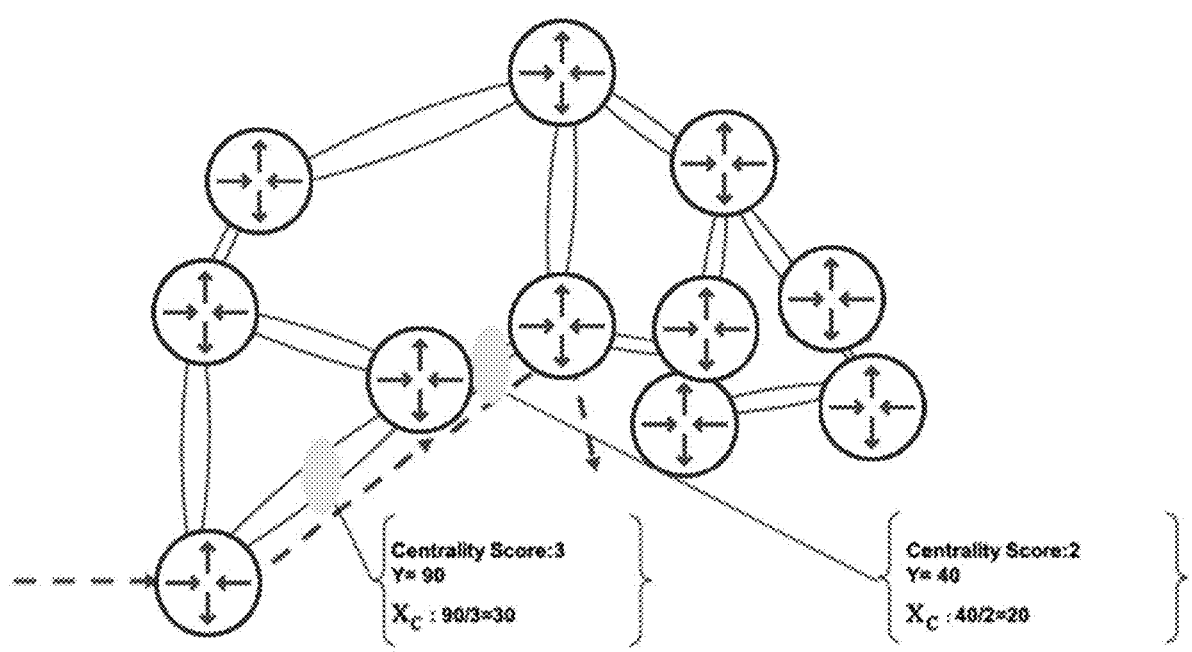
FIG. 4 is a network diagram of an example estimate based on the example network topology of FIG. 3.

FIG. 3 is a network diagram of calculated EBC for edges of an example network topology. FIG. 4 is a network diagram of an example estimate based on the example network topology of FIG. 3. Note that during network planning, the traffic is assumed to flow along shortest paths in the network, so the EBC is closely related to how much traffic network planners intended to traverse a link from various OD pairs.

To use the EBC to estimate the initial traffic matrix $x_0$, there should be a notion of fairness among flows using a link. This is like the scenario where all flows are the combination of Transmission Control Protocol (TCP) flows with any other flows which are TCP friendly. This assumption allows to estimate the fair share of aggregated traffic of a link used by all flows sharing the same link in their shortest path. It should be mention source of flows are not TCP friendly, it is the responsibility of network to enforce users to fairly utilize network bandwidth. This can be done by any variance of fair queuing. So, the OD flows can be estimated with:

$$\hat{x}_i = \underset{e \in P_i}{\mathrm{argmin}} \frac{y_e}{EBC(e)} \quad (4)$$

where $P_i$ is the path taken by the OD flow i, $y_e$ is the known link count on edge e, and this is estimating the flow as its minimum fair share among the links on its path. The initial estimate is given by concatenating the OD flows $x_0 = \{\hat{x}_1, \ldots, \hat{x}_n\}$.

The traffic estimate in (4) can be used directly as a traffic matrix estimate, or inside of an iterative estimation procedure (steps 24, 26 in FIG. 2). It should be obvious how (4) can be implemented as a software algorithm.

Iteratively Refining the Traffic Matrix

While the estimate using EBC captures what is known about the network topology, it may not fit with other information known about the traffic. There is no guarantee that the estimate obtained with (4) will satisfy (1). It is therefore recommended to use an iterative procedure to produce a traffic estimate that satisfies (1).

Without any loss of generality, focus on the case that each origin-destination pair (i, j) has only a single route between them, in which case R is a binary matrix as follows (where e denotes the index of edge):

$$R_{e,(i,j)} = \begin{cases} 1, & \text{if } e \text{ is used in a path between node } i \text{ and } j \\ 0, & \text{otherwise} \end{cases} \quad (5)$$

To support the option of multipath routing, which is known as Equal-Cost MultiPath (ECMP) routing, when there are multiple paths with the same cost, $R_{e,(i,j)}$ in (4) is non-binary matrix, with the entry in the row corresponding to link e and the column corresponding to pair (i, j):

$$R_{e,(i,j)} = \begin{cases} 1/|p|, & \text{if } e \text{ is used in one of } ECMP \text{ paths between node } i \text{ and } j \\ 0, & \text{otherwise} \end{cases} \quad (6)$$

Assuming a network of n nodes and r links, the traffic matrix of the network is a square matrix of dimension n×n, with diagonal elements equal to zero. The number of origin-destination (OD) pairs, denoted by c, is obtained as c=n×(n−1). By using this notation, the dimensions of y, R, and x are defined as r×1, r×c and c×1. Since there are fewer links r is than the number of OD pairs c in general networks, and R is not invertible (1) becomes and undetermined system.

One way to solve the undetermined equation is to find the matrix $\hat{x}$, which minimizes the $L_2$ norm distance to the left side of (1):

$$\hat{x} = \underset{x}{\operatorname{argmin}} \|Rx - y\| \quad (7)$$

which is one of the previous known approaches, but it ignores the knowledge of how the network is built and operates.

Instead, this approach is iterative and uses an iterative step $$\hat{x}_{i+1} = \underset{x \in \|Rx - y\| < \varepsilon}{\operatorname{argmin}} \|Rx - \hat{x}_i\| \quad (8)$$

where a quadratic programming problem is solved which pulls the estimate of the traffic matrix towards the previous estimate, while at the same time forcing to satisfy the constraint (1). An alternative way to satisfy (1) is to use a linear constraint:

$$\hat{x}_{i+1} = \underset{x \in Rx = y}{\operatorname{argmin}} \|Rx - \hat{x}_i\| \quad (9)$$

To further increase the robustness against collinearity of ordinary least squares regression, we also used regularization techniques e.g., Ridge regression (which is also referred to as L2 regularization, see, e.g., Ridge Regression, available online at ncss-wpengine.netdna-ssl.com/wp-content/themes/ncss/pdf/Procedures/NCSS/Ridge_Regression.pdf, the contents of which are incorporated by reference) and lasso regression, instead solving $$\hat{x}_{i+1} = \underset{x \in Rx = y}{\operatorname{argmin}} \|Rx - \hat{x}_i\| + \lambda \|\hat{x}_i\| \quad (10)$$

Note that the set of constraints used here is an example. Any number of other constraints can be derived and applied in equations such as (8), (9), (10), such as egress/ingress estimates, or information known from direct measurements. It is possible to implement (8), (9), (10) as a software algorithm.

Process

Figure 5:
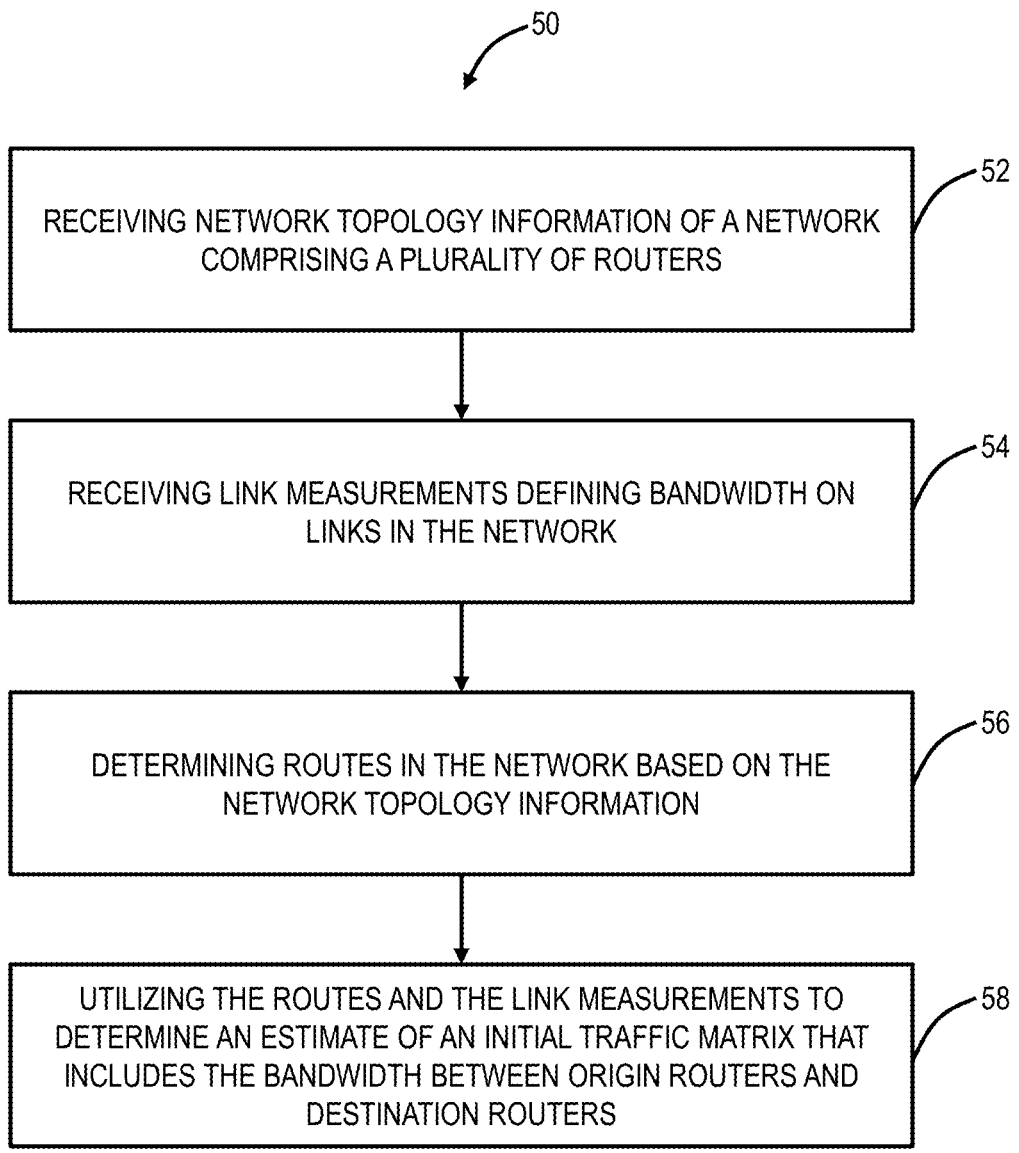
FIG. 5 is a flowchart of an iterative process to estimate a traffic matrix from link counters and routing information.

FIG. 5 is a flowchart of an iterative process 50 to estimate a traffic matrix from link counters and routing information. The process 50 contemplates implementation as a method, via circuitry or a processing device, and via instructions embodied in a computer-readable medium. The process 50 can be implemented by a network element, Network Management System (NMS), as off-box software, or the like.

The process 50 uses statistical information about the network topology graph to create an initial solution to the estimation problem. It then iteratively uses linear or quadratic programming to obtain more refined solutions of the traffic matrix that fit the known constraints from other network information.

The process 50 includes receiving network topology information of a network comprising a plurality of routers (step 52); receiving link measurements defining bandwidth on links in the network (step 54); determining routes in the network based on the network topology information (step 56); and utilizing the routes and the link measurements to determine an estimate of an initial traffic matrix that includes the bandwidth between origin routers and destination routers (step 58).

The determining routes can include determining edge betweenness centrality between the plurality of routers that are edges in a network graph. The determining routes assumes traffic flows on a shortest path between the plurality of routers. The process 50 estimates a network traffic matrix using information from the network topology such as graph features and statistics of the network topology where the network topology information is determined from collected routing information, the network topology is used to extract topology graph information, and the topology graph information is used to determine an estimate of the traffic matrix.

The process 50 can further include determining the routes from listening to routing protocol messages. The process 50 can further include receiving partial direct measurements for the bandwidth and subtracting the partial direct measurements from the link measurements before determining the estimate. The process 50 can further include repeating the receiving steps, the determining step, and the utilizing step at different points in time; and averaging results to determine a traffic matrix over the point in time and the different points in time.

The process 50 can further include iteratively adjusting the initial traffic matrix to refine the estimate using other network information. The other network information can include any of link capacity, network topology, queuing discipline, and link aggregation. The iteratively adjusting can utilize an iterative statistical estimation procedure. A refinement of the method where the estimate is used in an iterative statistical estimation procedure such as maximum likelihood estimation of the traffic matrix using the expectation maximization algorithm.

Integrating topology features is adding an extra information that is always needed in under constrained problems. Additional information can also be integrated through constraints on the model parameters or some functions of them e.g., QoS parameters for different flows. Such constraints are important to avoid unconstrained values for the initial point estimator which results in more accurate final estimation.

Performance

The performance of the process 50 was compared against real traffic traces from a backbone network. The source of data is the IP-level traffic flow measurements collected form every point of presence (PoP) in a live network having 11 PoPs resulting in 121 origin-destination flows as show in FIG. 4.

The data is sampled flow data from every router over a period of six months. For validation, the RMSRE (Root Mean Square Relative Error) is used to provide an overall relative metric for the errors in the estimates.

$$RMSRE = \sqrt{\sum_{i=1}^{n} \Delta x_{rel,i}^2 \cdot 1/n} \quad (6)$$

$$\Delta x_{rel,i}^2 = x_i/t_i - 1$$

where $t_i$ is the desired value and $x_i$ is the actual value.

The results for the three approaches are presented in Table 1. The table shows the original traffic matrix, the estimated value for each OD pair and the relative error. The average error was 30% for the gravity method, 27% for the tomogravity method, and 17% for the our approach which using the Ridge regularization.

TABLE 1

| Method | RMSRE |
|---|---|
| Simple Gravity(SG) | 29.6 |
| Tomogravity | 27 |
| The process 50 | 23 |
| The process 50 + L2 regularization | 17 |

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause a processing device to perform steps of:
   receiving network topology information of a network including a plurality of routers;
   receiving link measurements defining bandwidth on links in the network;
   determining routes in the network based on the network topology information; and
   utilizing the routes and the link measurements to determine an estimate of an initial traffic matrix that includes the bandwidth between origin routers and destination routers;
   wherein the determining routes includes determining edge betweenness centrality between the plurality of routers that are edges in a network graph.

2. The non-transitory computer-readable medium of claim 1, wherein the determining routes assumes traffic flows on a shortest path between the plurality of routers.

3. The non-transitory computer-readable medium of claim 1, wherein the steps further include
    determining the routes from listening to routing protocol messages.
4. The non-transitory computer-readable medium of claim 1, wherein the steps further include
    receiving partial direct measurements for the bandwidth and subtracting the partial direct measurements from the link measurements before determining the estimate.
5. The non-transitory computer-readable medium of claim 1, wherein the steps further include
    iteratively adjusting the initial traffic matrix to refine the estimate using other network information.
6. The non-transitory computer-readable medium of claim 5, wherein the other network information includes any of link capacity, network topology, queuing discipline, and link aggregation.
7. The non-transitory computer-readable medium of claim 5, wherein the iteratively adjusting utilizes an iterative statistical estimation procedure.
8. The non-transitory computer-readable medium of claim 1, wherein the initial traffic matrix is at a point in time, and wherein the steps further include
    repeating the receiving steps, the determining step, and the utilizing step at different points in time; and
    averaging results to determine a traffic matrix over the point in time and the different points in time.
9. An apparatus comprising:
    one or more processors and memory storing instructions that, when executed, cause the one or more processors to
    receive network topology information of a network including a plurality of routers;
    receive link measurements defining bandwidth on links in the network;
    determine routes in the network based on the network topology information; and
    utilize the routes and the link measurements to determine an estimate of an initial traffic matrix that includes the bandwidth between origin routers and destination routers;
    wherein the routes are determined by determining edge betweenness centrality between the plurality of routers that are edges in a network graph.
10. The apparatus of claim 9, wherein the routes are determined by assuming traffic flows on a shortest path between the plurality of routers.
11. The apparatus of claim 9, wherein the instructions that, when executed, further cause the one or more processors to
    determine the routes from listening to routing protocol messages.
12. The apparatus of claim 9, wherein the instructions that, when executed, further cause the one or more processors to
    receive partial direct measurements for the bandwidth and subtract the partial direct measurements from the link measurements before determining the estimate.
13. The apparatus of claim 9, wherein the instructions that, when executed, further cause the one or more processors to
    iteratively adjust the initial traffic matrix to refine the estimate using other network information.
14. The apparatus of claim 9, wherein the instructions that, when executed, further cause the one or more processors to
    repeat the receive steps, the determine step, and the utilize step at different points in time; and
    average results to determine a traffic matrix over the point in time and the different points in time.
15. A method comprising:
    receiving network topology information of a network including a plurality of routers;
    receiving link measurements defining bandwidth on links in the network;
    determining routes in the network based on the network topology information; and
    utilizing the routes and the link measurements to determine an estimate of an initial traffic matrix that includes the bandwidth between origin routers and destination routers;
    wherein the routes are determined by determining edge betweenness centrality between the plurality of routers that are edges in a network graph.
16. The method of claim 15, further comprising
    determining the routes from listening to routing protocol messages.
17. The method of claim 15, further comprising
    receiving partial direct measurements for the bandwidth and subtracting the partial direct measurements from the link measurements before determining the estimate.
18. The method of claim 15, further comprising
    iteratively adjusting the initial traffic matrix to refine the estimate using other network information.

\* \* \* \* \*